United States Patent
Sanders et al.

(10) Patent No.: US 7,697,144 B2
(45) Date of Patent: Apr. 13, 2010

(54) OPTICAL FIBER COATING SYSTEM AND MONITORING METHOD FOR IMPROVED THERMAL PERFORMANCE IN FIBER OPTIC SENSORS

(75) Inventors: Paul E. Sanders, Madison, CT (US); Andrew S. Kuczma, Clinton, CT (US)

(73) Assignee: Weatherford/Lamb, Inc., Houston, TX (US)

(*) Notice: Subject to any disclaimer, the term of this patent is extended or adjusted under 35 U.S.C. 154(b) by 99 days.

(21) Appl. No.: 11/861,001

(22) Filed: Sep. 25, 2007

(65) Prior Publication Data
US 2009/0079989 A1   Mar. 26, 2009

(51) Int. Cl.
*G01C 19/72* (2006.01)
(52) U.S. Cl. .................................. 356/465
(58) Field of Classification Search .............. 356/460, 356/465
See application file for complete search history.

(56) References Cited

U.S. PATENT DOCUMENTS

| | | | | |
|---|---|---|---|---|
| 4,708,479 A | * | 11/1987 | Dye et al. | 356/464 |
| 5,416,585 A | | 5/1995 | Hadeler | |
| 5,870,194 A | * | 2/1999 | Cordova et al. | 356/465 |
| 6,054,068 A | | 4/2000 | Carlson et al. | |

FOREIGN PATENT DOCUMENTS

| | | |
|---|---|---|
| EP | 0 170 897 | 7/1984 |
| GB | 2 157 425 | 10/1985 |
| GB | 2 255 821 | 11/1992 |
| JP | 4151512 | 4/1990 |
| JP | 06074777 A * | 3/1994 |

OTHER PUBLICATIONS

P. Mottier et al., Solid State Optical Gyrometer Integrated on Silicon, Electronics Letter, pp. 1975-1977, vol. 33, No. 23, Nov 6, 1997.
GB Search Report from Application No. GB0817382.5 dated Dec. 3, 2008.
Canadian Office Action, Application No. 2,639,692, dated Apr. 22, 2009.

* cited by examiner

*Primary Examiner*—Michael A Lyons
(74) *Attorney, Agent, or Firm*—Patterson & Sheridan, LLP

(57) ABSTRACT

A method and apparatus for reducing the thermal induced errors in an IFOG system. The apparatus including a highly thermally conductive material configured to encapsulate a waveguide of an interferometric fiber optic gyroscope (IFOG). The highly thermally conductive material more evenly distributes thermal changes encountered by a sensing coil of the IFOG thereby substantially reducing errors in the IFOG system.

20 Claims, 2 Drawing Sheets

OPTICAL FIBER COATING SYSTEM AND MONITORING METHOD FOR IMPROVED THERMAL PERFORMANCE IN FIBER OPTIC SENSORS

BACKGROUND OF THE INVENTION

1. Field of the Invention

Embodiments described herein generally relate to an apparatus and method for improving the performance of one or more fiber optic sensors. More particularly, embodiments described herein relate to a coating on a fiber configured to improve the performance of the sensor. More particularly still, embodiments described herein relate to a highly thermally conductive material which encapsulates the fiber in order to reduce thermal errors in an interferometric fiber optic gyroscope (IFOG).

2. Description of the Related Art

Optical sensor systems operate by exposing a portion of an optical waveguide to an environmental condition that modulates a light signal transmitted within the optical waveguide. This modulation alters one or more parameters of the light transmitted within the optical waveguide, such as amplitude, power distribution versus frequency/wavelength, phase, or polarization. Analyzing modulated light emerging from the waveguide enables determining values indicative of the environmental condition. Such systems utilize sensors based on, for example, Bragg gratings or interferometers to measure a wide variety of parameters, such as strain, displacement, velocity, acceleration, flow, corrosion, chemical composition, temperature, or pressure. In one example of an optical sensor system, an interferometric fiber optic gyroscope (IFOG) enables measuring angular rotation as it alters the path length of counter-propagating waves of light traveling through a sensing coil of an optical fiber, thereby producing phase changes from which measurements can be made.

Typical IFOG systems use a beam splitter, or coupler, to split light from a light source into counter propagating waves traveling in the sensing coil. A detector having associated electronics measures the phase relationship between the two interfering counter-propagating beams of light that emerge from the opposite ends of the sensing coil. The difference between the phase shifts experienced by the two beams is proportional to the rate of rotation of the platform to which the instrument is fixed, due to the Sagnac effect.

Typical IFOG systems are highly sensitive to changes in the thermal condition around the IFOG. Changes in the temperature surrounding the coiled sensor produces thermal gradients acting across the IFOG sensing coil that result in variant localized thermal expansion of the fiber that produces non-reciprocal phase errors. The result is the Shupe effect which causes sensor drift over time that is both time and temperature dependent. The accuracy of the IFOG is then limited by the Shupe effect. Thermally induced phase errors occur if there is a time-dependent temperature gradient along the fiber. Non-reciprocity phase errors arise when clockwise and counter clockwise counter rotating beams traverse the same region of the fiber at different times. If the fiber's propagation velocity varies at different points along the fiber, the two beams traverse slightly different effective path lengths. The resulting phase shift is indistinguishable from the phase shift caused by rotation. It is very difficult to maintain temperature uniformity of the sensing coil required to eliminate these effects and maintain IFOG accuracy—even under steady thermal operating conditions.

Currently, one method for reducing the Shupe effect is through complex winding patterns. The fiber in the sensing coil is wound so that the sections of the fiber that are at equal distance from the coil center are beside each other, such as in the quadra, hexa, or octapolar wind. The complex winding allows the local thermal effects for each section of the fiber to be experienced at the same moment and at the same magnitude for each of the counter rotating beams. These complex winding patterns are difficult to assemble. Further, even with extreme care in winding, the sensing coil exhibits residual drift. The residual drift is due to an incomplete cancellation of the different contributions on a complex and nonlinear temperature model based upon temperature and time derivatives. Although the temperature model is well understood, precise thermal monitoring of the sensing coil required to compensate for Shupe effect errors, is difficult to implement due to the low thermal mass, insulating properties of typical polymer-coated glass optical fibers. The complex winding patterns minimize gross thermally induced Shupe effect errors. However, inherent winding imperfections and thermal transients lead to residual drift over time and become a function of a complex nonlinear thermal model.

Therefore, a need exists for a method and apparatus for improved thermal performance in Sagnac fiber optic sensors. Moreover, a need exists for an optical fiber coating system and monitoring system to improve the thermal performance in Sagnac fiber optic sensors.

SUMMARY OF THE INVENTION

This application relates to an IFOG system. The IFOG system comprises a light source and one or more waveguides configured to be interrogated by one or more signals sent from the light source. The IFOG system has a sensing coil which comprises a portion of the one or more waveguides wound around a spool. An encapsulant surrounds at least a portion of each of the one or more waveguides. The encapsulant is constructed of a highly thermally conductive material configured to distribute thermal changes surrounding the sensing coil to the one or more waveguides. The IFOG further comprises a coupler optically coupling the light source to the sensing coil and the sensing coil to the detector.

This application relates to a method of reducing thermal induced errors in an IFOG system. The method comprises providing an optical fiber and a material having a high thermal conductivity. The method further comprises encapsulating the optical fiber with the material and winding the optical fiber with the encapsulant around a spool thereby forming a sensing coil. The method further comprises substantially distributing thermal changes surrounding the sensing coil to the optical fiber through the material and detecting angular rotation via interrogation of the sensing coil.

This application relates an apparatus for reducing thermally induced errors in an IFOG system. The apparatus comprises an optical fiber and an encapsulant surrounding the optical fiber. The encapsulant has a outer diameter greater than an outer diameter of the optical fiber, and wherein the optical fiber with the encapsulant is wound around a spool to form a sensing coil and wherein the encapsulant is made from a material having a thermal conductivity of greater than 1 W/m-K.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
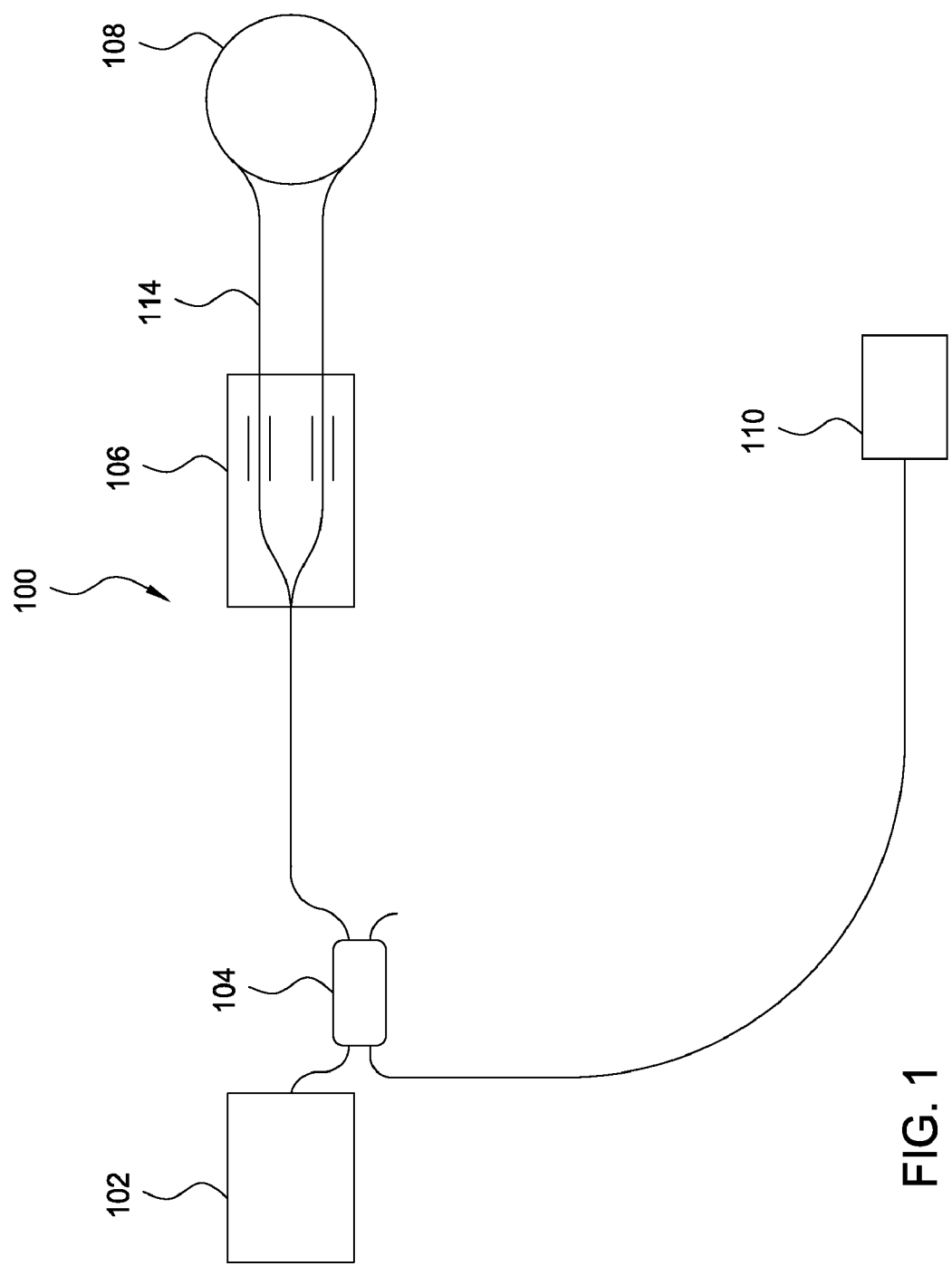
FIG. 1 is a schematic view of an interferometric fiber optic gyroscope (IFOG) according to one embodiment described herein.

FIG. 1 is a schematic view of an interferometric fiber optic gyroscope (IFOG) 100 according to one embodiment described herein. The IFOG 100 includes a light source 102, a first coupler 104, a second coupler 106, a sensing coil 108, and a detector 110. The first coupler 104 may also connect to a photodiode and associated pre-amp (not shown). The pre-amp is used to detect the Sagnac effect caused by rotation of sensing coil 108. The second coupler 106 may include an integrated optics chip (IOC). An optical fiber 114, or waveguide, used in the sensing coil 108 includes a thermally conductive encapsulant as will be described in more detail below.

The light source 102 may be any fiber light source. The light source 102 is configured to interrogate the optical fibers 114. Any light source 102 may be used so long as it is capable of interrogating the optical fiber 114.

The optical fiber 114 is used in the IFOG and the fiber optic sensing coil 108. The optical fiber 114 is typically made of either a polarization maintaining (PM) fiber or a low birefringence (standard telecommunications) fiber. The sensing coil 108 comprises the optical fiber 114 wound upon a supportive spool 300, shown in FIG. 3. The sensing coil 108 serves as an optical guide for receiving a counter-propagating beam pair emitted from the light source 102.

The detector 110 detects light split by the couplers 104 and 106 into counter-propagating waves traveling in the sensing coil 108. The associated electronics measure the phase relationship between the two interfering counter-propagating beams of light that emerge from opposite ends of the sensing coil 108. The difference between the phase shifts experienced by the two beams is proportional to the rate of rotation of the platform to which the instrument is fixed.

Figure 2:
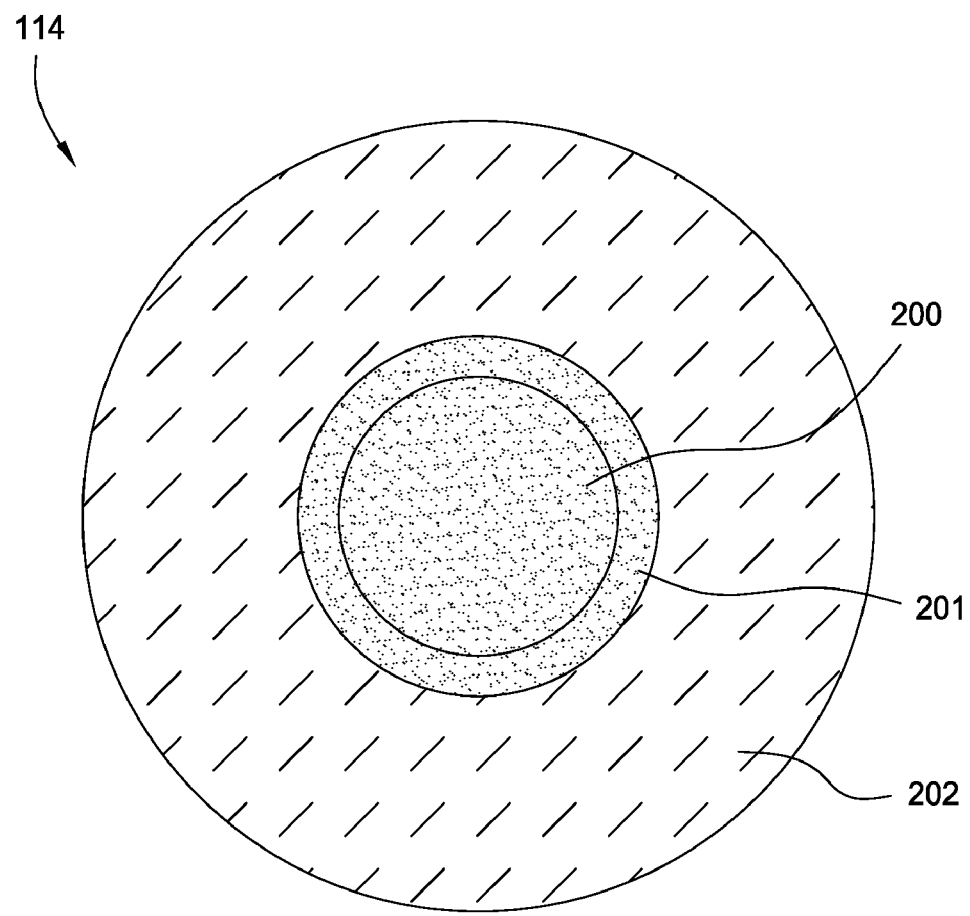
FIG. 2 is a cross sectional view of a waveguide according to one embodiment described herein.

FIG. 2 is a cross-sectional view of the optical fiber 114 used in the sensing coil 108. The optical fiber 114 includes a waveguide 200, an optional waveguide coating 201, and an encapsulant 202 surrounding the waveguide 200. The waveguide 200 may be any waveguide described herein or known in the art. The waveguide coating 201 may be any coating used to surround and protect the waveguide 200 from damage. In one embodiment, the waveguide coating 201 is made from the same material as the encapsulant 202. The waveguide coating 201 may be a separate item from the encapsulant 202 or an integral part of the encapsulant 202. The encapsulant 202 is constructed with a thermally conductive material. In one embodiment, the thermal conductivity of the encapsulant 202 is greater than 1 watts per meter Kelvin (W/m-K). The encapsulant 202, according to one embodiment, is a silver-filled silicone, which has a room temperature thermal conductivity of about 1.4 W/m-K. The high thermal conductivity results in a corresponding reduction in Shupe effect or sensitivity to changes in heating rate. Although described as using a silver-filled silicone, it should be appreciated that any highly thermally conductive material may be used including, but not limited to, metals, thermal or radiation-cured elastomers including silicone, acrylates, vinyl ethers, epoxies. Further any of the encapsulant can be filled with highly thermal conductive fillers including, but not limited to, aluminum, silver, gold, copper, aluminum oxide, zinc oxide, silicia, graphite and boron nitride.

The thermal conductivity of the encapsulant 202 and/or the coating 201 allows the waveguide 200 to be rapidly effected by thermal changes surrounding the sensing coil 108 during use. The thermal conductivity of the encapsulant 202 serves to distribute thermal gradients more efficiently over the sensing coil 108 thereby reducing differential thermal gradients on the sensing coil 108 that cause errors. Further, the time constants for any subsequent thermal gradients shorten. These factors reduce the Shupe effect phase errors in Sagnac sensors. This enhances reciprocity and lowers residual drift performance of the quadric-/hex-/octapolar coil winding.

The use of identical material for the coating 201 and the encapsulant 202 may reduce any differential thermal expansion between the coating 201 and the encapsulant 202. Therefore, the stress between the coating 201 and the encapsulant 202 reduce, thereby minimizing the stress acting on the optical fiber 114 of the sensing coil 108. The use of the coating 201 and/or the encapsulant 202 enables practical sensing and monitoring.

In one embodiment, multiple fast, low mass temperature sensors, such as thermistors or platinum resistant thermometers, strategically placed on or within the sensing coil 108 can provide a true representation of the sensing coil 108 thermal profile in real time to allow computational extraction of the Shupe effect phase error.

The encapsulant 202 may be coupled directly to the entire fiber or the coating 201 during the optical fiber 114 manufacturing process. Therefore, the optical fiber 114 used to construct the IFOG 100 is predisposed to reduce thermally induced errors in the sensing coil 108 prior to being formed into the sensing coil 108. Although the encapsulant 202 may be placed on the entire optical fiber 114, it is contemplated that the encapsulant 202 is located only in the portion of the optical fiber 114 that makes up the sensing coil 108.

Figure 3:
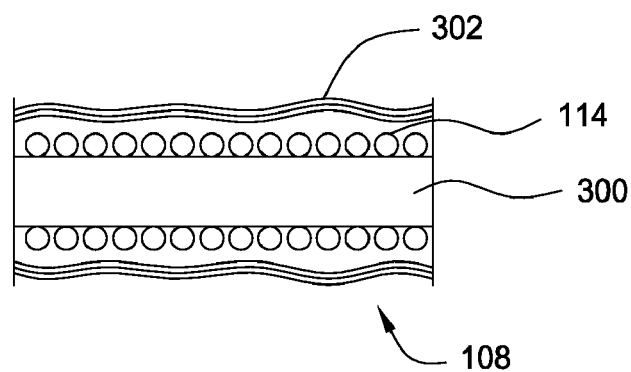
FIG. 3 is a cross sectional view of a sensing coil according to one embodiment described herein.

FIG. 3 is a cross sectional view of the sensing coil 108. The sensing coil 108 includes the optical fiber 114 wound around the spool 300. Further, the sensing coil 108 may include a potting material 302 in addition to the encapsulant 202 around the optical fiber 114. The potting material is constructed of a highly thermally conductive material. The potting material may be constructed of the same material described above for the encapsulant 202. The potting material is placed around the wound optical fibers 114 of the spool. The potting material serves the dual purpose of reducing thermal errors in the sensing coil 108 and securing the wound optical fibers 114 of the sensing coil 108.

While the foregoing is directed to embodiments of the present invention, other and further embodiments of the invention may be devised without departing from the basic scope thereof, and the scope thereof is determined by the claims that follow.

The invention claimed is:

1. An interferometric fiber optic gyroscope (IFOG) system, comprising:
    a light source;
    one or more waveguides configured to be interrogated by one or more signals sent from the light source;
    a sensing coil which comprises a portion of the one or more waveguides wound around a spool;
    an encapsulant surrounding at least a portion of each of the one or more waveguides, wherein the encapsulant is constructed of a highly thermally conductive material configured to distribute thermal changes surrounding the sensing coil to the one or more waveguides;

a potting material securing the wound optical waveguides to the spool, wherein the potting material is also constructed of a highly thermally conductive material; and a coupler optically coupling the light source to the sensing coil and the sensing coil to a detector.

2. The IFOG system of claim 1, wherein the material has a thermal conductivity of greater than 1 W/m-K.

3. The IFOG system of claim 1, wherein the material is a silver filled silicone.

4. The IFOG system of claim 1, wherein the one or more waveguides are one or more optical fibers.

5. The IFOG system of claim 4, further comprising a coating between each of the one or more optical fibers and the encapsulant.

6. The IFOG system of claim 5, wherein the coating is configured from a second highly thermally conductive material.

7. The IFOG system of claim 6, wherein the highly thermally conductive material and the second highly thermally conductive material have a thermal conductivity of greater than 1 W/m-K.

8. The IFOG system of claim 6, wherein the highly thermally conductive material is a silver filled silicone.

9. The IFOG system of claim 8, wherein the second highly thermally conductive material is a silver filled silicone.

10. The IFOG system of claim 1, wherein the encapsulant surrounds all of the one or more waveguides.

11. A method of reducing thermally induced errors in an IFOG system, comprising:

providing an optical fiber;
providing a material having a high thermal conductivity;
encapsulating the optical fiber with the material;
winding the optical fiber with the encapsulant around a spool thereby forming a sensing coil;
securing the wound optical fiber to the spool with a potting material, wherein the potting material is also constructed of a highly thermally conductive material;
substantially distributing thermal changes surrounding the sensing coil to the optical fiber through the material; and
detecting angular rotation via interrogation of the sensing coil.

12. The method of claim 11, wherein the material has a thermal conductivity of greater than 1 W/m-K.

13. The method of claim 11, wherein the material is a silver filled silicone.

14. The method of claim 11, further comprising providing a coating between the encapsulating material and the optical fiber.

15. The method of claim 12, wherein the coating and the encapsulating material have a conductivity of greater than 1 W/m-K.

16. An apparatus for reducing thermally induced errors in an IFOG system, comprising:

a spool;
an optical fiber wound around the spool, wherein the optical fiber is secured to the spool with a potting material constructed of a highly thermally conductive material; and
an encapsulant surrounding the optical fiber, wherein the encapsulant has a outer diameter greater than an outer diameter of the optical fiber, and wherein the optical fiber with the encapsulant is wound around the spool to form a sensing coil and wherein the encapsulant is made from a material having a thermal conductivity of greater than 1 W/m-K.

17. The apparatus of claim 16, wherein the encapsulant is configured to substantially distribute thermal changes surrounding the sensing coil to the optical fiber.

18. The apparatus of claim 16, wherein the material is a silver filled silicone.

19. The apparatus of claim 16, wherein the potting material is a silver filled silicone.

20. A method of reducing thermally induced errors in an IFOG system, comprising:

providing an optical fiber; providing a material having a high thermal conductivity; encapsulating the optical fiber with the material; winding the optical fiber with the encapsulant around a spool thereby forming a sensing coil;
securing the wound optical fiber to the spool with a potting material, wherein the potting material is also constructed of a highly thermally conductive material;
substantially distributing thermal changes surrounding the sensing coil to the optical fiber through the material;
providing multiple temperature sensors attached at strategic points to the coil;
detecting angular rotation via interrogation of the sensing coil; and
compensating any residual temperature-induced errors using the temperature measurement data.

* * * * *